United States Patent [19]

Schaffer

[11] Patent Number: 4,922,307

[45] Date of Patent: May 1, 1990

[54] METHOD AND APPARATUS FOR IMPROVING THE MEASURING ACCURACY OF A MICROMETER

[75] Inventor: Michael J. Schaffer, Torrance, Calif.

[73] Assignee: Hughes Aircraft Company, Los Angeles, Calif.

[21] Appl. No.: 213,852

[22] Filed: Jun. 30, 1988

[51] Int. Cl.$^5$ .................... G01C 3/08; G01B 11/14
[52] U.S. Cl. ............................ 356/5; 356/373; 356/381; 356/384; 33/707; 33/813; 33/818
[58] Field of Search ............... 356/4, 5, 20, 373, 381, 356/384; 33/707, 813, 818–820, 827–829

[56] References Cited

U.S. PATENT DOCUMENTS

| | | | |
|---|---|---|---|
| 3,172,940 | 3/1965 | Räntsch | 356/373 |
| 3,813,165 | 5/1974 | Hines et al. | 356/5 |
| 4,320,577 | 3/1982 | Lauritzen | 250/252.1 |
| 4,377,036 | 3/1983 | Dangschat | 33/707 X |
| 4,666,295 | 5/1987 | Duvall, III et al. | 356/5 |
| 4,715,706 | 12/1987 | Wang | 356/5 |
| 4,732,472 | 3/1988 | König et al. | 356/5 X |
| 4,786,176 | 11/1988 | Froome | 356/373 |

OTHER PUBLICATIONS

"Digital English/Metric Electrolimit Supermicrometer, Model C, U 302566, Instruction Book", Mar. 1979, Revised Apr. 1981, Pratt & Whitney Measuring Systems Operation.

"Laser Doppler Displacement Meter", Optodyne, Inc., undated.

*Primary Examiner*—Thomas H. Tarcza
*Assistant Examiner*—Linda J. Wallace
*Attorney, Agent, or Firm*—William J. Streeter; Wanda K. Denson-Low

[57] ABSTRACT

This invention provides apparatus and method to increase the direct measurement accuracy of a rotary encoder type of micrometer 10. To overcome a maximum measurement accuracy of 100 microinches there is provided a laser displacement meter which includes a laser head 24 which is coupled to a micrometer bed 12 by a pair of of clamps 26a and 26b and by a magnetic plate 28. Laser head 24 has an output display 30 associated therewith for indicating the magnitude of the measurement made by the laser head 24. Laser head 24 is operable for providing an output chirped laser beam 32 and for receiving a reflected output beam 34. A corner cube reflector 36 is mounted by an arm 38 to a headstock spindle 18. The reflected return beam is detected and processed by a phase demodulator and converted into pulses. The pulses are counted and converted to distance and displayed. Operating in accordance with the Doppler effect, movement of the reflector induces a frequency shift in the chirped laser beam, the frequency shift being a function of velocity of the moving reflector and, hence, the velocity and distance traveled by the spindle 18. This frequency shift is detected by the phase demodulator and is converted to a displacement.

9 Claims, 2 Drawing Sheets

METHOD AND APPARATUS FOR IMPROVING THE MEASURING ACCURACY OF A MICROMETER

FIELD OF THE INVENTION

This invention relates generally to measuring instruments and, in particular, relates to a laser displacement meter which is coupled to a micrometer to significantly improve the measuring accuracy of the micrometer.

BACKGROUND OF THE INVENTION

One type of micrometer which is known for measuring the dimensions of a workpiece is a direct reading micrometer having a headstock and a tailstock movably coupled to a bed. Movement of the headstock is detected by a rotary encoder, the encoder output providing an indication of the dimension of the the workpiece. One such type of micrometer is known as the Supermicrometer, Model C, manufactured by the Pratt & Whitney Measuring Systems Operation of West Hartford, CT. When utilized as a direct reading instrument the Model C Micrometer is specified to be accurate to within 0.0001 inches (100 microinches). While this accuracy may be sufficient for some measuring applications, for other applications it is desirable to measure the dimensions of an object to a greater accuracy. However, due to the nature of the rotary encoder which detects the movement of the headstock, direct reading measurements which exceed the 0.0001 inch accuracy are believed to be unattainable with this type of micrometer.

It is therefore one object of the invention to provide a direct reading micrometer of the rotary encoder type which has a measurement accuracy which is greater than an accuracy provided by the rotary encoder.

It is a further object of the invention to provide apparatus and method for modifying a direct reading micrometer of the rotary encoder type to provide a greater measurement accuracy.

It is an other object of the invention to provide a direct reading micrometer having a laser displacement meter for measuring the displacement of the headstock from the tailstock during a measurement operation.

It is a still further object of the invention to provide a direct measurement micrometer system having a laser displacement meter which provides a measurement accuracy of at least 0.000005 inches (5 microinches).

SUMMARY OF THE INVENTION

The foregoing objects of the invention are met by apparatus and method to increase the direct measurement accuracy of a rotary encoder type of micrometer. To overcome a maximum measurement accuracy of 100 microinches there is provided a laser displacement meter which includes a laser head which is coupled to a micrometer bed by a pair of clamps and by a magnetic plate. The laser head has an output display associated therewith for indicating the magnitude of the measurement made by the laser head. The laser head is operable for providing an output chirped laser beam and for receiving the reflected output beam. In order to reflect the output beam back to the laser beam there is provided a reflector, such as a corner cube reflector mounted by an arm to a headstock spindle. The reflected return beam is detected and processed by a phase demodulator and converted into pulses. The pulses are counted and converted to distance and displayed. Operating in accordance with the well known Doppler effect, movement of the reflector induces a frequency shift in the chirped laser beam, the frequency shift being a function of velocity of the moving reflector and, hence, the velocity and distance traveled by the spindle. This frequency shift is detected by the phase demodulator and is converted to a displacement.

The invention also provides apparatus for measuring a dimension of an object, the apparatus having at least one movable component for contacting the object. The distance that the movable component is moved along an axis relative to a reference position is indicative of the dimension of the object. The apparatus comprises means for measuring the distance that the movable component moves along the axis relative to the reference position. The distance measuring means includes means, such as a laser having a chirped output beam, for transmitting electromagnetic radiation in a direction substantially parallel to the axis and towards the movable component; means, coupled to the movable component and movable therewith, for reflecting the transmitted radiation in a direction substantially parallel to the axis; means for detecting the reflected radiation; and means, having an input coupled to the detecting means, for determining a distance that the reflecting means and movable component have moved, if any, relative to the reference position, the distance being indicative of the dimension of the object.

In accordance with one method of the invention there is disclosed a method of increasing the measurement accuracy of a micrometer of the type having a bed defining an axis and a spindle movable along the axis between at least a first reference position and a second position. The method comprises the steps of transmitting a chirped laser radiation beam parallel to the axis and towards the spindle; reflecting the laser radiation 360° with a reflector coupled to the spindle and movable therewith; receiving the reflected laser radiation and phase demodulating the received laser radiation; and determining the distance, if any, that the spindle has moved along the axis relative to the reference position.

BRIEF DESCRIPTION OF THE DRAWING

The foregoing and other aspects of the invention will be made more apparent in the following detailed description of a preferred embodiment read in conjunction with the accompanying drawing wherein;

FIG. 1A is a block diagram illustrating in greater detail an embodiment of a laser displacement meter;

DETAILED DESCRIPTION OF A PREFERRED EMBODIMENT

Figure 1:
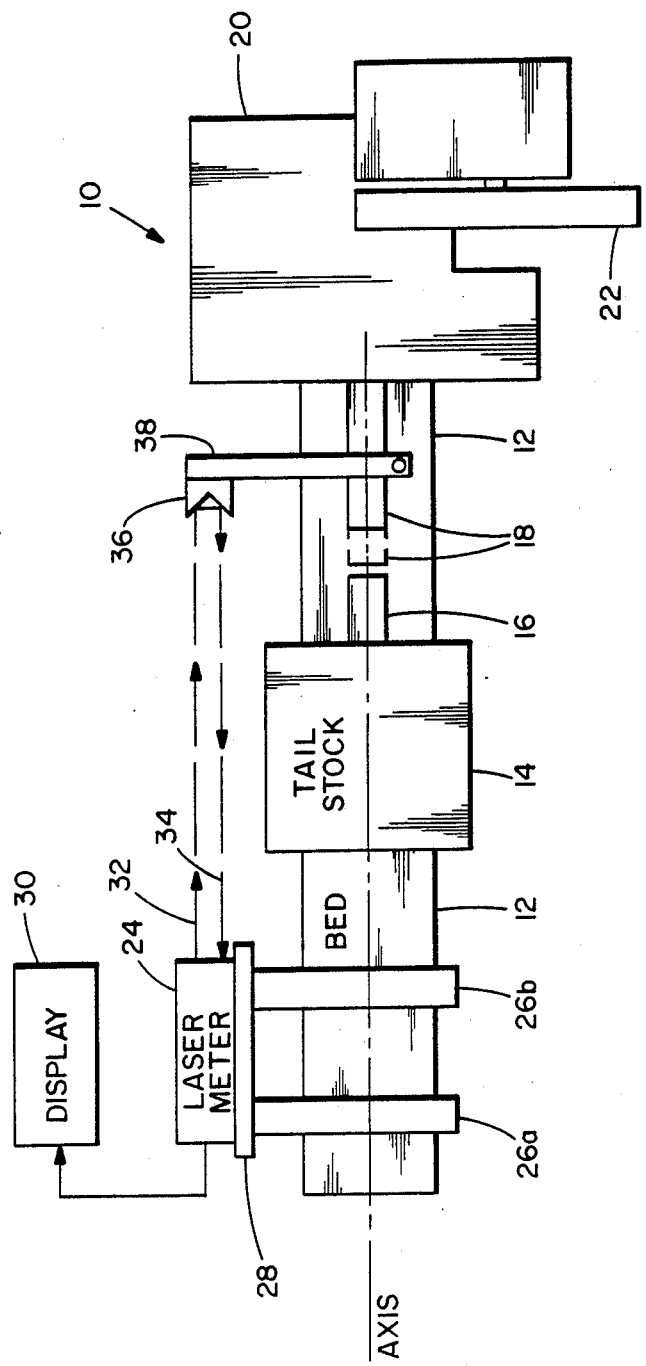
FIG. 1 is a block diagram showing a micrometer system having a laser displacement meter coupled thereto for improving the direct measurement accuracy of the system.

Referring first to FIG. 1 there is shown a micrometer 10 having an embodiment of the invention. Micrometer 10 may be a Supermicrometer, Model C, manufactured by the Pratt & Whitney Measuring Systems Operation of West Hartford, CT. It should be realized however, that the micrometer 10 may include other types of micrometers and that the teaching of the invention is not necessarily limited for use with the Supermicrometer Model C.

The micrometer 10 comprises an axis defined by a cylindrical bed 12 on which is movably coupled a tail stock 14 including a tail anvil 16 and also a headstock spindle 18. Headstock spindle 18 is shown in FIG. 1 in two positions, namely a first position shown in dotted outline and a second position shown in solid outline. The length of movement of the headstock spindle 18 between the first and second positions is one inch. Headstock spindle 18 is coupled to a headstock 20 and a setting wheel 22. Headstock 20 includes a rotary encoder, not shown, having an output which is a function of the distance that the headstock spindle 18 moves. A display, not shown, is coupled to the output of the rotary encoder for indicating the movement of the headstock spindle 18. As has been previously stated, the accuracy of the rotary encoder limits the accuracy of the detection of the motion of headstock spindle 18 during a direct measurement of an object to approximately 100 microinches.

In operation, an object to be measured is placed between the tailstock anvil 16 and the headstock spindle 18. The distance that the headstock spindle 18 must be moved in order to accommodate the object is an indication of the dimension of the object between the face of the tailstock anvil 16 and the face of the headstock spindle 18.

To overcome the maximum measurement accuracy of 100 microinches there is provided, in accordance with the invention, a laser displacement meter which comprises a laser head 24 which is coupled to the bed 12 by means of a pair of clamps 26a and 26b and by a magnetic plate 28. Laser head 24 preferably has an output display 30 associated therewith for indicating the magnitude of the measurement made by the laser head 24. Laser head 24 is operable for providing an output laser beam, indicated by the arrows 32, and for receiving the reflected output beam, indicated by the arrows 34. In order to reflect the output beam back to the laser head 24 there is provided a reflector, such as a corner cube reflector 36 mounted by an arm 38 to the headstock spindle 18.

One suitable laser displacement meter is known as a Laser Doppler Displacement Meter (LDDM) Model III, manufactured by Optodyne, Inc. of Compton, CA. Both "Laser Doppler Displacement Meter" and "LDDM" are trademarks of Optodyne, Inc. of Compton, CA. As shown in FIG. 1A The laser displacement meter comprises the laser head 24 which includes a HeNe laser 24A and a photodetector 24B. An electro-optical device 24C is used to chirp the output laser beam 32. The reflected return signal 34 is detected and processed by a phase demodulator 24D and converted into pulses. The pulses are counted and converted to distance in desired English or metric units and displayed. Operating in accordance with the well known Doppler effect, movement of the reflector induces a frequency shift in the chirped laser beam, the frequency shift being a function of velocity of the moving reflector and, hence, the velocity and distance traveled by the spindle 18. This frequency shift is detected by the phase demodulator 24D and is converted to a displacement. In accordance with the invention, the use of the laser displacement meter provides an improvement in direct measurement accuracy of from 100 microinches to approximately 5 microinches.

Figure 2:
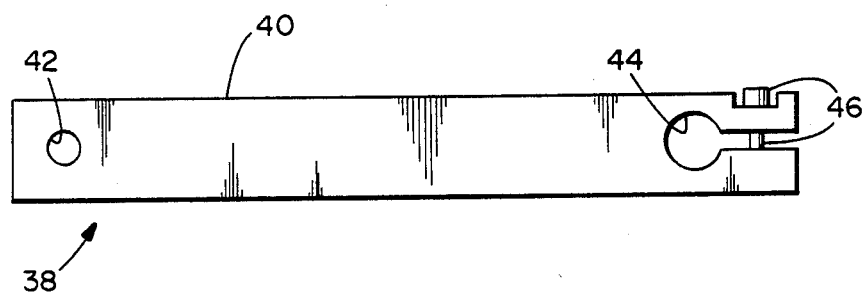
FIG. 2 is a frontal view of an arm which is adapted to be coupled at a first end to a cylindrical spindle of the micrometer and at the second end to a corner cube reflector.

FIG. 2 shows a side view of the arm 38 wherein it can be seen that the arm 38 comprises a unitary member of metal having a body portion 40 having a threaded opening 42 made therein for mounting the corner cube reflector 36. In the preferred embodiment of the invention reflector 36 is provided with a threaded mounting boss on a rear surface. At an opposing end of the member 40 is another opening 44 through which the headstock spindle 18 passes. A compression device, such as a screw 46 is provided for tightening the member, via the opening 44, around the headstock spindle 18. In the preferred embodiment of the invention the opening 42 is a threaded hole one-quarter of an inch in diameter and the opening 44 is approximately 0.375 inches in diameter. The total length of the arm 38 is approximately 3 inches and the width is approximately one-half of an inch. The thickness of the arm is approximately 0.2 inches.

Figure 3:
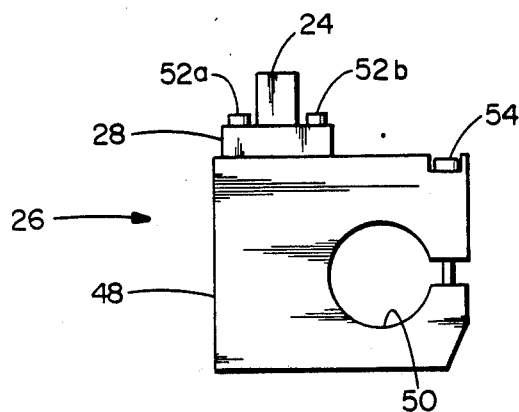
FIG. 3 is a frontal view of a clamp which is adapted to clamp a magnetic plate and associated laser head to the cylindrical micrometer bed.

Referring to FIG. 3 there is shown a frontal view of one of the clamps 26, for example the clamp 26a. It can be seen that the clamp 26 comprises a body portion 48 having an opening 50 for engaging the cylindrical bed 12. Bolted to an upper surface of the member 48 is one end of the magnetic plate 28, the plate being affixed by, for example, a pair of bolts 52a and 52b. Another bolt 54 is provided for securely engaging the clamp 26 around the cylindrical bed 12.

In accordance with one aspect of the invention, the magnetic plate 28 mounts the metallic body of the laser head 24 magnetically such that any stresses and resultant drift which would result from bolting the laser to the plate are eliminated, thereby enhancing the accuracy and repeatability of direct measurements. Furthermore, the use of the magnetic plate 28 permits the laser 24 to be readily moved thereby facilitating the initial optical alignment of the laser head 24 to the reflector 36.

To align and calibrate the laser head 24 along the axis defined by the bed 12 the arm 38 and reflector 36 are mounted on the spindle 18 in a desired position. The clamps 26 are affixed to the bed 12 and the magnetic plate 28 is bolted to the clamps. The laser meter 24 is thereafter placed upon the magnetic plate 28, energized and the display 30 is monitored while the laser head 24 is positioned until a return is received from the corner cube reflector 36. After being properly positioned, the laser head 24 is securely held in place by a magnetic field generated by the magnetic plate 28.

The spindle 18 is preferably moved from the first position, or reference position, to the second position, over the full one inch of travel, in order to insure that an adequate reflection is received over the entire range of travel of the spindle 18. When the laser head 24 is properly aligned along the axis, relative to the reflector 36, the display 30 indicates the displacement of the spindle 18 from the reference position over the spindles' full range of travel. If desired, one or more reference gage blocks may be measured in order to verify the accuracy of the displayed measurement.

It can be seen that the teaching of the invention provides for the modification of a direct measurement micrometer of the rotary encoder type to a higher accuracy micrometer. This modification is simply and relatively inexpensively achieved without requiring any permanent structural modifications to the micrometer itself. Furthermore, inasmuch as the invention provides for a spindle displacement measuring device which is based on transmitted and reflected electromagnetic radiation, as opposed to a mechanical rotary encoder, the overall measurement accuracy of the micrometer is improved.

The invention therefore provides, for a micrometer having an axis along which a spindle is translated, for transmitting with a source of electromagnetic radiation substantially parallel to the axis, reflecting the transmitted radiation with a reflector coupled to and translated with the spindle, the reflected radiation being reflected back towards the source, detecting the reflected radiation with a detector and determining the distance, if any, that the spindle is offset from a reference position.

It should be appreciated that an illustrative embodiment of the invention has been provided above and that modifications to this embodiment may occur to those having skill in this art. Thus, the invention is not intended to be limited to only that disclosed above, but is instead meant to be limited only as defined by the appended claims.

What is claimed is:

1. A micrometer apparatus for measuring a dimension of an object, the apparatus having at least one movable component for contacting the object, the distance that the movable component is moved along an axis relative to a reference position being indicative of the dimension of the object, the apparatus comprising means for measuring the distance that the movable component moves along the axis relative to the reference position, said distance measuring means comprising:

laser means for transmitting chirped laser radiation in a direction substantially parallel to the axis and towards the movable component;

means, coupled to the movable component and movable therewith, for reflecting the transmitted radiation in a direction substantially parallel to the axis;

means for detecting the reflected radiation;

phase demodulator means, having an input coupled to the detecting means, for determining a distance that the reflecting means and movable component have moved, if any, relative to the reference position, the distance being indicative of the dimension of the object; and coupling means including means for magnetically coupling said laser means to the micrometer apparatus.

2. A micrometer apparatus as defined in claim 1 wherein said reflecting means comprises a corner cube reflector.

3. A micrometer apparatus as defined in claim 1 wherein the micrometer apparatus includes a bed and wherein said laser means is coupled to said bed by said coupling means, said coupling means being comprised of at least one clamp means clamped to said bed for supporting magnetic plate means, said laser means being disposed upon said magnetic plate means and magnetically coupled thereto.

4. A micrometer apparatus for measuring a dimension of an object, the apparatus having at least one movable component for contacting the object, the distance that the movable component is moved along an axis relative to a reference position being indicative of the dimension of the object, the apparatus comprising means for measuring the distance that the movable component moves along the axis relative to the reference position, said distance measuring means comprising:

means for transmitting chirped laser radiation in a direction substantially parallel to the axis and towards the movable component;

corner cube reflector means, coupled to the movable component and movable therewith, for reflecting the transmitted radiation in a direction substantially parallel to the axis;

means for detecting the reflected radiation; and phase demodulator means, having an input coupled to the detecting means, for determining a distance that the reflecting means and movable component have moved, if any, relative to the reference position, the distance being indicative of the dimension of the object; and wherein said movable component is a spindle of a micrometer, the micrometer having a bed coincident with the axis.

5. The method of increasing the measurement accuracy of a micrometer of the type having a bed defining an axis and a spindle movable along the axis between at least a first reference position and a second position, comprising the steps of:

transmitting a chirped laser radiation beam parallel to the axis and towards the spindle;

reflecting the laser radiation 360° with a reflector coupled to the spindle and movable therewith;

receiving the reflected laser radiation and phase demodulating the received laser radiation; and determining the distance, if any, that the spindle has moved along the axis relative to the reference position.

6. A method as defined in claim 5, wherein the step of transmitting comprises an initial step of mounting the laser upon a magnetic plate which is clamped to the bed.

7. A method as defined in claim 6 wherein the step of reflecting comprises an initial step of mounting a corner cube reflector to the spindle.

8. In a micrometer of the type having an axis defined by a bed, the micrometer having a spindle having a face movable in a parallel relationship with the bed between an anvil face and a predetermined maximum extent of spindle face travel, the micrometer having rotary encoder for indicating to a first maximum accuracy a dimension of an object interposed between the anvil face and the spindle face as a function of distance moved by the spindle, the improvement comprising:

a laser transmitter disposed relative to the bed for transmitting a chirped laser beam towards the spindle in a direction substantially parallel to the axis;

a reflector coupled to the spindle and movable therewith for reflecting the laser beam back towards the transmitter; and a laser beam receiver for receiving the reflected laser beam and phase demodulating the reflected beam to determine the distance moved by the spindle whereby the dimension of the object is determined to a second maximum accuracy which is greater than the first maximum accuracy.

9. A micrometer as defined in claim 8 wherein the first maximum accuracy is approximately 100 microinches and wherein the second maximum accuracy is approximately 5 microinches.

* * * * *

UNITED STATES PATENT AND TRADEMARK OFFICE
CERTIFICATE OF CORRECTION

PATENT NO.   :   4,922,307

DATED        :   May 1, 1990

INVENTOR(S) :   Michael J. Schaffer

It is certified that error appears in the above-identified patent and that said Letters Patent is hereby corrected as shown below:

Drawing

Insert FIG. 1A in the drawing as shown below.

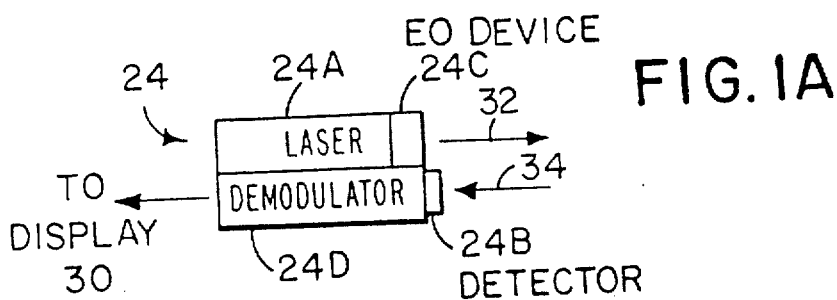

Signed and Sealed this

Thirteenth Day of August, 1991

Attest:

HARRY F. MANBECK, JR.

Attesting Officer

Commissioner of Patents and Trademarks